United States Patent [19]
Brozoski et al.

[11] 4,205,434
[45] Jun. 3, 1980

[54] TRIGGER SPEED CONTROL SWITCH SUBASSEMBLY AND METHOD OF MAKING

[75] Inventors: Daniel J. Brozoski, Franksville; Frank T. Pupak, Menomonee Falls, both of Wis.

[73] Assignee: Eaton Corporation, Cleveland, Ohio

[21] Appl. No.: 943,704

[22] Filed: Sep. 19, 1978

Related U.S. Application Data

[62] Division of Ser. No. 849,676, Nov. 8, 1977, Pat. No. 4,137,490.

[51] Int. Cl.[2] ........................ H02P 5/16; H01R 43/02; H01H 65/00

[52] U.S. Cl. ........................................ 29/860; 29/622; 318/345 G; 361/386; 200/157; 338/198

[58] Field of Search .................. 29/628, 622; 200/157; 310/50; 318/345 D, 249, 345 C, 345 CB, 345 B; 361/379, 380, 381, 388, 387

[56] References Cited

U.S. PATENT DOCUMENTS

| | | | |
|---|---|---|---|
| 3,447,057 | 5/1969 | Brown et al. | 310/50 X |
| 3,543,120 | 11/1970 | Robertson | 310/50 X |
| 3,739,198 | 6/1973 | Clements | 318/345 D X |
| 3,761,788 | 9/1973 | Matthews et al. | 318/345 C |
| 3,775,576 | 11/1973 | Brown | 200/157 |
| 3,936,708 | 2/1976 | Dummer | 200/157 X |
| 3,999,287 | 12/1976 | Lockard | 29/628 X |
| 4,115,838 | 9/1978 | Yagusic et al. | 361/388 |

*Primary Examiner*—Milton S. Mehr
*Attorney, Agent, or Firm*—Hugh R. Rather; Wm. A. Autio

[57] ABSTRACT

A speed control subassembly is made by providing a generally flat heat sink plate having a laterally-formed collector strip at its upper edge. A double-sided-adhesive insulator tape strip is stuck to the heat sink, this tape having a hole large enough to receive a thyristor chip so that the thyristor anode contacts the heat sink with solder paste therebetween. Two formed terminal strips extending in opposite directions are stuck to the tape so that one contacts the cathode and the other contacts the gate of the thyristor chip with solder paste therebetween. A chip capacitor is placed across the terminal strips with solder paste therebetween. A small force is applied to the capacitor and then heat is applied to the stack of parts to solder the parts together and to the heat sink and to set the adhesive resin. This subassembly is then placed into a trigger switch housing and connected to the contacts and variable resistor thereof to provide a trigger speed control switch for portable tools.

12 Claims, 7 Drawing Figures

TRIGGER SPEED CONTROL SWITCH SUBASSEMBLY AND METHOD OF MAKING

CROSS-REFERENCE TO RELATED APPLICATION

This is a division of application Ser. No. 849,676, filed Nov. 8, 1977, now U.S. Pat. No. 4,137,490.

BACKGROUND OF THE INVENTION

Trigger speed control switches have been known heretofore. For example, M. R. Dummer U.S. Pat. No. 3,936,708, dated Feb. 3, 1976, and assigned to the assignee of this invention, discloses a speed control subassembly wherein the mounting tab of a plastic pack semiconductor is soldered to a connector serving as a collector for the variable resistor, and the cathode and gate terminals of this semiconductor are connected across a capacitor and to the variable resistor, and this subassembly is connected to the contacts of a trigger switch to form a complete speed control trigger switch for portable tools. While such construction has been useful for its intended purposes, this invention relates to improvements thereover.

SUMMARY OF THE INVENTION

An object of the invention is to provide an improved trigger speed control switch.

Another object of the invention is to provide an improved method of making a trigger speed control switch.

A more specific object of the invention is to provide an improved speed control subassembly for a trigger speed control switch.

Another specific object of the invention is to provide an improved method of making a speed control subassembly for a trigger speed control switch.

Another specific object of the invention is to provide a trigger speed control switch that is simple in construction and economical to manufacture.

Other objects and advantages of the invention will hereinafter appear.

DESCRIPTION OF THE PREFERRED EMBODIMENT

Referring to FIGS. 1–7, there is shown a self-enclosed trigger speed control switch constructed in accordance with the invention. As shown therein, the switch comprises a spring-biased trigger 2 mounted for linear sliding movement in a switch housing. This housing comprises a frame 4 and a pair of base halves designated as left base L and right base R, respectively, most clearly shown in FIGS. 1–3. This frame 4 clamps the two halves of the base together upon insertion thereof up from the bottom and also clamps slidable rear portion **2*a* of the trigger on top of the base so that finger engaging portion 2*b* extends forwardly under the force of trigger return spring 6** for depression by the forefinger of the user.

Figure 3:
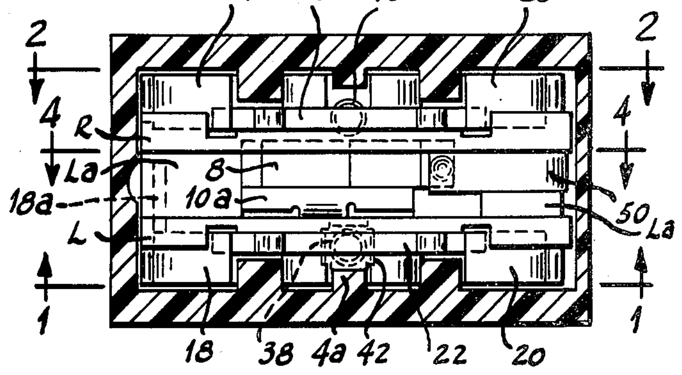
FIG. 3 is a horizontal cross-sectional view taken substantially alone line 3—3 of FIG. 1 to show the contacts and variable resistor strip in top view.
Figure 4:
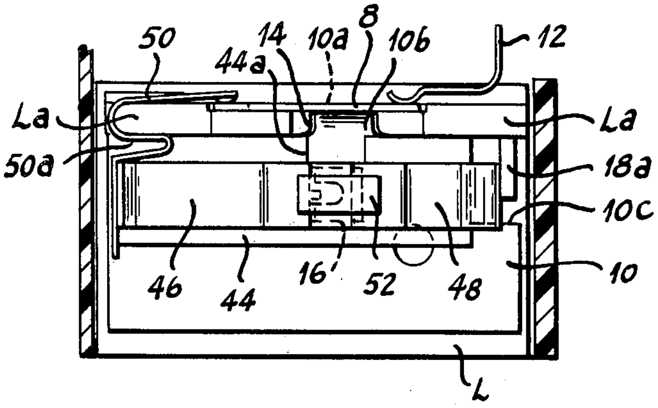
FIG. 4 is a vertical cross sectional view taken substantially along line 4—4 of FIG. 3 to show the speed control subassembly mounted to the left base half within the center compartment.

To form a center compartment for the speed control subassembly, the left base half is provided with an upper ledge La shown in FIGS. 3 and 4, and the right base half is provided with a lower ledge (not shown), each abutting the other base half when the two base halves are clamped together by the frame, as shown in more detail in H. W. Brown U.S. Pat. No. 3,775,576, dated Nov. 27, 1973, and assigned to the assignee of this invention. Ledge La extends toward the right against base half R at a location a short distance below the top of the base to provide a defined space above this ledge for resistor strip 8 and collector strip **10*a* arranged side by side for simultaneous engagement by sliding contact or brush 12** as shown in FIGS. 3 and 4.

This ledge La and base half R are provided with means holding them in registration with one another to prevent them from moving in any direction in a vertical plane as seen in FIG. 4 while the surrounding frame holds them from spreading apart. This means comprises suitable projections and notches as more specifically described in the aforementioned Brown patent.

Figure 5:
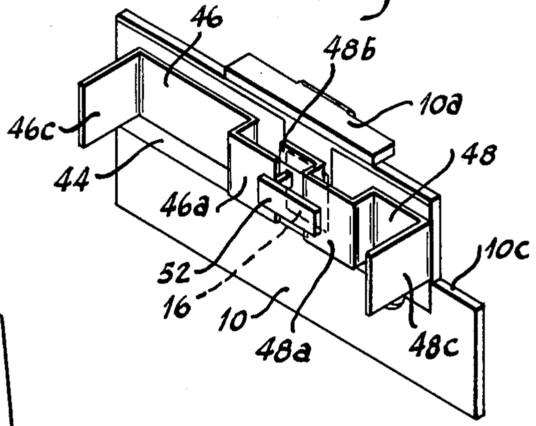
FIG. 5 is an isometric view of the speed control subassembly of the switch also shown in FIG. 4 in elevation.

Collector (or connector) **10*a* is the upper integral portion of a flat vertical heat sink 10 that is suspended from ledge La by its T-shaped upper portion marked 10*a* in FIGS. 3–5. This flat vertical heat sink 10 supports the speed control elements hereinafter described. This flat, substantially rectangular heat sink 10 is pressed flat against the wall of left base half L within the center compartment and is suspended from ledge La by integrally formed T-shaped collector 10*a*. For this purpose, the stem 10*b*, shown in FIG. 4, of this T-shaped portion extends up through lateral slot 14 that divides ledge La into two parts, and the crossbar 10*a* of this T-shaped portion is bent 90 degrees toward the right side of the switch as shown in FIGS. 3–5 to lie flat in a shallow groove in the upper surface of this ledge as shown in FIG. 4 to provide a "collector" type electrical connector along which movable contact brush 12** of the variable resistor runs when the trigger is moved.

Figure 7:
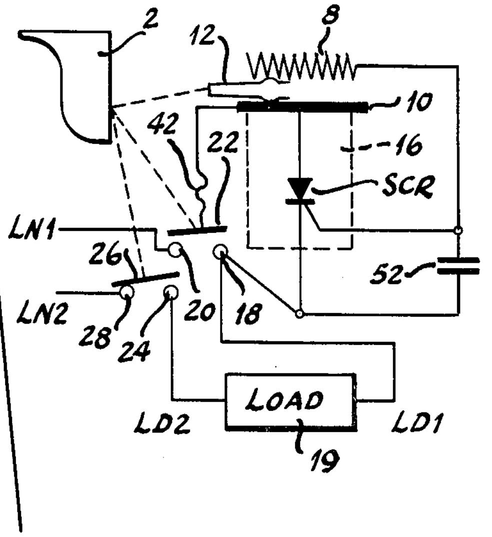
FIG. 7 is a schematic circuit diagram of the speed control trigger switch of FIGS. 1–6 and of its connection to a load.

To insure good electrical contact at all times, movable contact 12 is provided with four resilient fingers having downwardly-bowed portions at their contact end as shown in FIG. 4, two of which slide on resistor strip 8 to vary the resistance in the circuit and the other two of which slide on connector **10*a* to maintain the resistor slider connected to the heat sink as shown schematically in the circuit diagram of FIG. 7. The mounting end of this movable contact 12** is bent upwardly and is frictionally held in a slot in the trigger, as shown in FIG. 1, for movement with the trigger.

Heat sink 10 is made of electrically conducting metal of good heat conducting type such as tin-plated copper and forms the anode terminal for the silicon controlled rectifier (SCR) chip 16 enclosed in broken lines in FIG. 7. This heat sink is provided with a notch 10c at its forward upper corner as shown in FIGS. 4 and 5 to provide electrical clearance for lateral tab 18a of the shunting switch stationary contact 18 shown in FIGS. 1, 3, and 4.

This trigger speed control switch is provided with a double-pole switch that closes both sides of the line on initial depression of the trigger thereby to connect load 19 in series with the speed control circuit across AC power lines LN1 and LN2, and is provided with a shunting switch or contact that closes near the end of the trigger depression stroke to shunt the speed control circuit and thus connect the load directly across the AC lines. Variable speed control takes place during the intermediate portion of trigger depression that occurs after the double-pole on-off switch closes and before the shunting switch closes.

Figure 1:
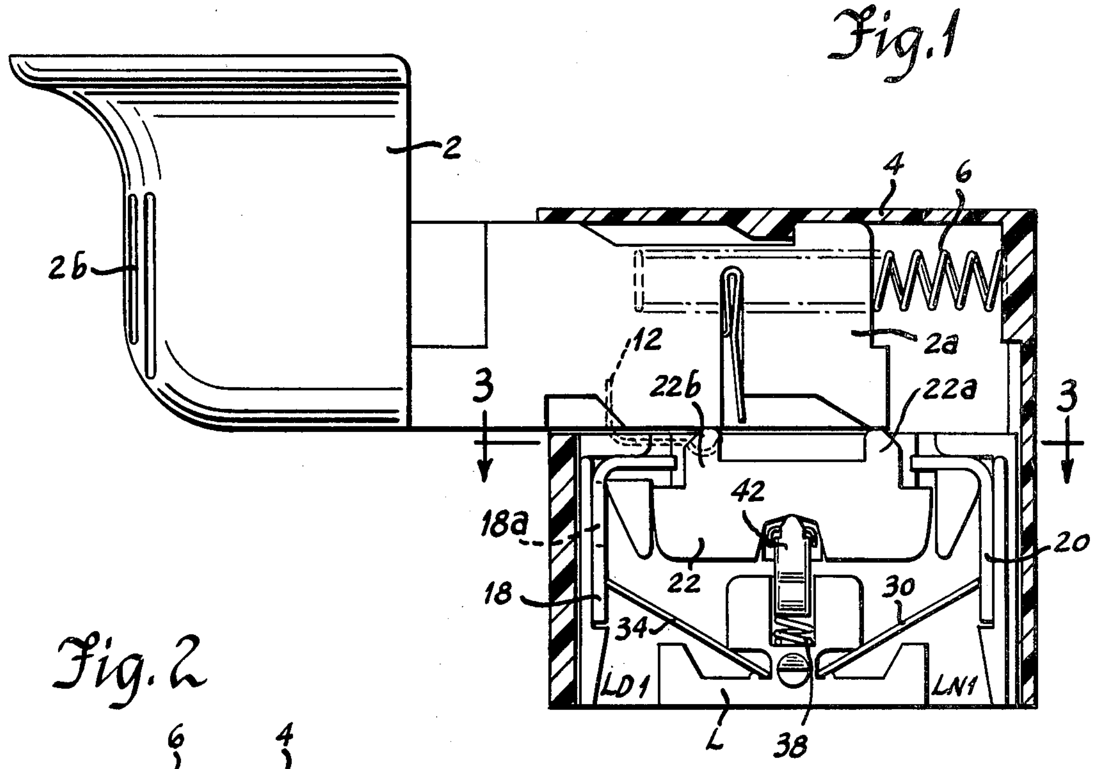
FIG. 1 is an enlarged left elevational view of the trigger speed control switch with the left side wall of the frame broken away substantially along line 1—1 of FIG. 3 to show the left pole of the two-pole switch, the shunting contact and connectors in the left compartment.

One pole of the double-pole switch includes rear stationary contact 20 and the rear half of movable butt contact 22 shown in FIG. 1, this pole being the left pole of the switch and being mounted in the left side compartment of the switch housing as shown in FIG. 3. The other pole of the double-pole switch includes forward stationary contact 24 and movable butt contact 26 shown in FIG. 2, this pole being the right pole of the switch and being mounted in the right side compartment of the housing as shown in FIG. 3. Movable contact 26 always engages a rear connector 28 whereby it is connected to power line LN2 as shown in FIG. 7.

Power line LN1 is connected to contact 20 in FIG. 1 by pressing the stripped and soldered end of the stranded conductor up through the slot in the base half L and between contact 20 and leaf spring retainer 30. In a similar manner, power line LN2 is connected by pushing it between connector 28 and leaf spring retainer 32 in FIG. 2.

The load is connected by pushing one of its wire leads between contact 18 and leaf spring retainer 34 in FIG. 1. And the other load lead is pushed between contact 24 and leaf spring retainer 36 in FIG. 2 to provide the connections shown schematically in FIG. 7.

Figure 2:
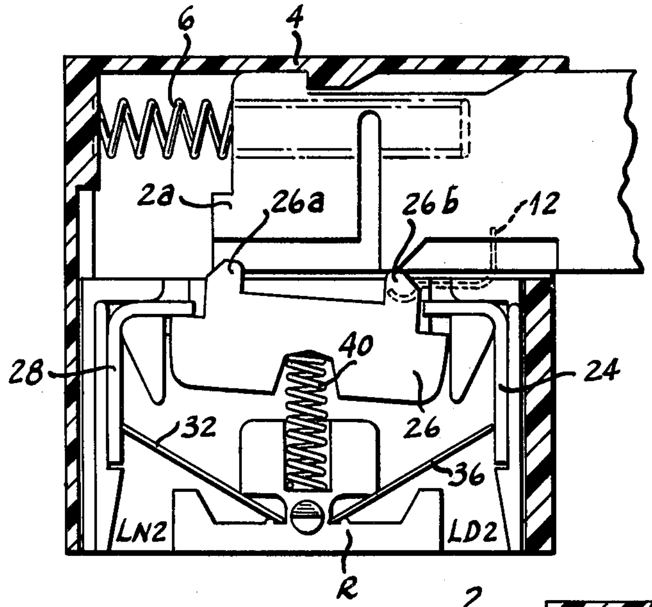
FIG. 2 is a right side elevational view of the housing and part of the trigger of the switch of FIG. 1 with the right side wall of the frame broken away substantially along line 2—2 of FIG. 3 to show the second pole of the 2-pole switch and connectors in the right compartment.

As shown in FIGS. 1 and 2, helical compression springs 38 and 40 bias movable butt contacts 22 and 26, respectively, toward closed positions with their respective stationary contacts and the trigger is provided with cam surfaces for operating these movable butt contacts. Butt contact 22 is a flat piece of electrically conductive metal such as copper and is provided with a center notch in its lower edge into which spring-biased connector cap 42 is seated. One arm of cap 42 contacts heat sink 10 through an aperture in the left base half L as more clearly shown in the aforementioned H. W. Brown or M. R. Dummer patents while its other arm bears against a vertical rib 4a on the inner wall of the frame as shown in FIG. 3. A shoulder at the rear end of contact 22 underlies stationary contact 20 and upon closure connects one power line LN1 to the speed control circuit, the connection going through connector cap 42 to the heat sink. A shoulder at the forward end of contact 22 underlies stationary contact 18 and forms the shunting switch for bypassing the speed control circuit for full speed operation of the load device which may be a portable electric drill.

Movable butt contact 26 is like butt contact 22 except that it has only one circuit closing contact at its forward end and its rear end forms a connector always in engagement with connector 28 as shown in FIG. 2. Butt contact 26 is provided with a like notch at its lower center for seating spring 40. A shoulder at its forward end underlies stationary contact 24 and a similar shoulder at its rear end constantly engages the underside of connector 28.

As shown in FIG. 1, movable butt contact 22 is provided with a pair of upwardly projecting cam followers including a rear cam follower 22a and a forward cam follower 22b. These two cam followers are pressed upwardly against the trigger cams for operation by the trigger as described in the aforementioned H. W. Brown patent.

Movable butt contact 26 is similar and is provided with rear and forward cam followers 26a and 26b, shown in FIG. 2, although only forward cam follower 26b is operated by the trigger cam as more fully described in the aforementioned H. W. Brown patent.

Figure 6:
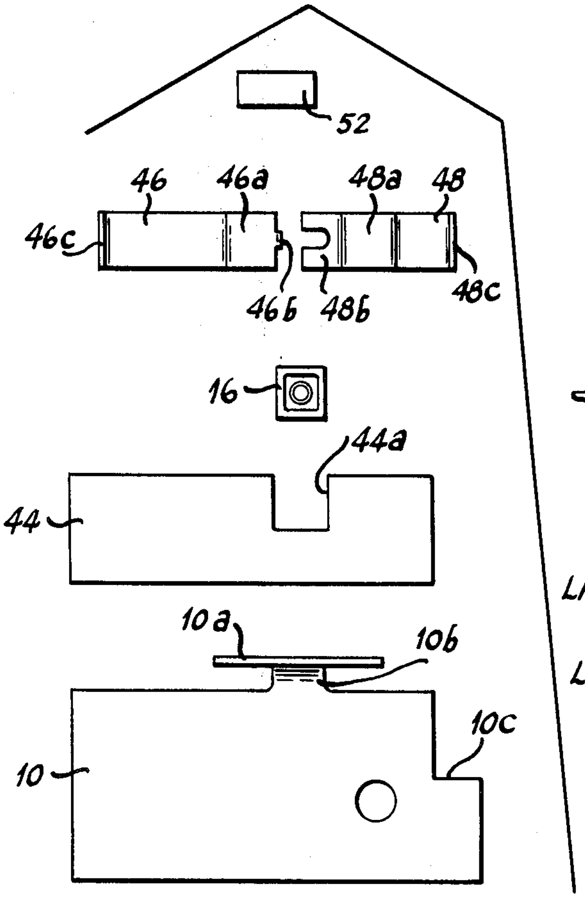
FIG. 6 is an exploded view of the parts of the subassembly of FIG. 5.

As shown in FIGS. 4–6, this switch is provided with an improved speed control subassembly that is put together by a unique method. A piece of tape 44 is provided with adhesive on both sides and a hole or notch 44a large enough to receive thyristor chip 16 such as an SCR is cut at one side of this tape. One surface of this double-sided adhesive tape is then stuck onto the surface of heat sink 10. The thyristor chip is then placed within this hole 44a with its anode side against the heat sink and with solder paste therebetween preparatory to securing the SCR chip to the heat sink as hereinafter described. A pair of terminals 46 and 48 are formed so as to contact the gate and cathode, respectively, of the thyristor. For this purpose, these terminals are made by cutting predetermined lengths of metal ribbon such as tin plated copper and forming them. Terminal 46 is provided with an offset portion 46a having a narrow strip 46b at one end bent back to contact the gate at the center of the thyristor when the main portion of this terminal is stuck to the tape as shown in FIG. 5. The other end 46c is bent out at an angle to afford connection thereto a connector 50 that contacts the rear end of resistor strip 8 as shown in FIG. 4. Connector 50 may be soldered to terminal 46 and provided with a suitable reentrant bend 50a so that it applies inherent pressure contact to the resistor strip.

Terminal 48 is provided with a similar offset portion 48a with one end bent back and to the left in FIG. 6 and provided with a bifurcated tip 48b to contact the cathode of the thyristor that surrounds the gate on the chip, as shown in FIGS. 5 and 6, when the main part of this terminal is stuck to the tape. While a thyristor having a cathode surrounding its gate is shown, other than center gate types such as edge-connected gate types can be used. Solder paste is placed between contacts 46b and 48b of these terminals and the gate and cathode of the thyristor. The other end 48c of this terminal is bent out at an angle to allow connection thereof to tab 18a later on as shown in FIG. 4.

Then, solder paste is placed on the offset portions 46a and 48a of these terminals and monolythic chip capacitor 52 is placed thereacross.

Thereafter, a small force is applied to capacitor 52 to hold the parts together and heat is applied to this subassembly to secure the parts together. The anode of the thyristor becomes soldered to the heat sink, the terminals 46 and 48 become soldered to the gate and cathode of the thyristor, and the capacitor becomes soldered across these terminals. Also, this heat which may be about 400 degrees F. (204° C.) and applied by a solder plate or the like sets the adhesive tape resin to fix the tape and the terminals securely to the heat sink.

This tape may be a 3M Co. polyester film having a rubber resin thermosetting adhesive on both sides, or the like. This polyester film is a thin, physically durable and high dielectric tape having excellent chemical, solvent and moisture resistance. The thermosetting adhesive appearing on both sides of the tape, when subjected to the required thermosetting cycle, will cross-link to provide greater adhesion, bonding, higher solvent resistance and generally better heat resistance.

As a result of the aforementioned method of making, there is provided a speed control subassembly wherein the thyristor, the two terminals and the capacitor are rigidly secured to the heat sink and electrically connected to one another and to the heat sink and electrically insulated in the proper manner. This subassembly may then be easily mounted in the trigger switch housing and electrically connected to the resistor strip and contacts to provide the circuit shown in FIG. 7.

The circuit in FIG. 7 is operated by depressing trigger 2. On initial depression of the trigger, double-pole on-off contacts 20–22 and 24–26 close to connect the SCR in series with the load across the AC power lines LN1 and LN2. Further depression of the trigger causes brush 12 to slide along resistor 8 to reduce the value of resistance in the circuit. As a result, the current flow to capacitor 52 increases to charge this capacitor to the firing value of the SCR earlier on each positive half-cycle of the AC supply voltage, that is, on each half-cycle that positive voltage is applied to the anode of the SCR. This causes the SCR to fire into conduction earlier on each positive half-cycle of the supply voltage and to conduct for the remainder of each such positive half-cycle thereby to increase the motor speed, assuming that the load is a motor of a portable tool such as a drill. The motor speed can be controlled by variation of the trigger depression. At or near the end of the trigger depression, shunting contacts 18–22 close to by-pass the SCR and connect the load directly across the power lines for full speed operation.

While the apparatus hereinbefore described is effectively adapted to fulfill the objects stated, it is to be understood that the invention is not intended to be confined to the particular preferred embodiment of trigger speed control switch and method of making disclosed, inasmuch as it is susceptible of the various modifications without departing from the scope of the appended claims.

We claim:

1. The method of making a trigger speed control subassembly comprising:

providing a heat sink in the form of a generally flat electrical and heat conductive metal plate having mounting and connecting means formed at one edge thereof;

sticking a double-sided-adhesive insulating tape to said heat sink, the tape having a slot therein;

placing a three-terminal thyristor in said slot with one of the terminals in contact with the heat sink and solder therebetween;

sticking a pair of formed terminal strips to said tape adjacent said slot so that first ends thereof contact the second and third terminals of said thyristor and the other ends thereof extend away from said heat sink to provide connector portions;

placing a chip capacitor across said terminal strips with solder therebetween;

and applying a small force to hold the aforementioned parts together and at the same time applying heat thereto to flow the solder and to set the adhesive to secure the parts together and to the heat sink.

2. The method of making a trigger speed control switch comprising:

providing a heat sink in the form of a generally flat electrical and heat conductive metal plate having mounting and connector strip means at one edge thereof;

sticking a double-sided adhesive insulating tape to said heat sink, the tape having a hole therein;

placing a controllable thyristor in said hole with one of its main terminals in contact with the heat sink and solder therebetween;

sticking a pair of offset-formed terminal strips to said tape adjacent said hole so that first formed ends thereof contact the other main terminal and the control terminal of said thyristor;

placing a capacitor across said terminal strips with solder therebetween;

holding the aforementioned parts together while applying heat thereto to melt the solder and to set the adhesive to secure said parts together and to said heat sink thereby to form a speed control subassembly;

installing said subassembly in a trigger switch housing having a variable resistor and switch contacts therein;

and connecting this subassembly to the variable resistor and switch contacts in said housing.

3. The method of making a trigger speed control switch claimed in claim 2, wherein:

said step of sticking a pair of off-set formed terminal strips to said tape adjacent said hole so that first formed ends thereof contact the other main terminal and the control terminal of said thyristor comprises placing solder therebetween so that when said heat is later applied said other main terminal and said control terminal become soldered to the respective terminal strips.

4. The method of making an electrical subassembly comprising:

providing a heat sink in the form of an electrical conducting metal member having mounting and connecting means formed thereon and also a generally flat area;

providing a thin electrically insulating sheet to insulate a pair of terminals from said heat sink;

forming a pair of terminals to provide thyristor contacting tips thereon and capacitor bridging portions spaced from said thyristor contacting tips;

performing the following four steps in a predetermined order:

placing a controllable thyristor on said generally flat area of said heat sink with one of its main conducting terminals in contact with said heat sink and placing solder therebetween;

sticking said insulating sheet on said generally flat area of said heat sink adjacent said thyristor;

sticking said terminals on said insulating sheet adjacent said thyristor so that said contacting tips thereof contact the other main conducting terminal and the control terminal, respectively, of said thyristor;

placing a capacitor across said capacitor bridging portions of said pair of terminals and placing solder therebetween;

and then applying heat to melt the solder to secure the thyristor to the heat sink and the capacitor to the terminals to form an electrical subassembly that may be connected by said heat sink connecting means and said pair of terminals to a larger circuit where it is used.

5. The method of making an electrical subassembly claimed in claim 4, wherein:

said method also comprises the following step performed with said four steps in a predetermined order:

placing solder between said contacting tips of said terminals and said other main conducting terminal and control terminal of said thyristor so that when said heat is applied said contacting tips will become soldered to said main and control thyristor terminals.

6. The method of making an electrical subassembly claimed in claim 4, wherein:

said application of said heat is such that the adhesive effecting said sticking of of said insulating sheet to said heat sink and said terminals to said insulating sheet is simultaneously set to securely retain these parts together.

7. The method of making an electrical subassembly comprising:

providing a heat sink in the form of an electrical conducting metal member having mounting and connecting means formed thereon and also a generally flat area;

providing a thin electrically insulating sheet to insulate a pair of terminals from said heat sink;

forming a pair of terminals to provide thyristor contacting tips thereon and capacitor bridging portions spaced from said thyristor contacting tips;

performing the following assembly steps in a predetermined order:

placing a controllable thyristor on said generally flat area of said heat sink with one of its main conducting terminals in contact with said heat sink and placing solder therebetween;

applying heat to solder said thyristor to said heat sink;

sticking said insulating sheet on said generally flat area of said heat sink adjacent said thyristor;

sticking said terminals on said insulating sheet adjacent said thyristor so that said contacting tips thereof contact the other main conducting terminal and the control terminal, respectively, of said thyristor;

placing a capacitor across said capacitor connector portions of said pair of terminals and placing solder therebetween;

and applying heat to solder said capacitor to said terminals.

8. The method of making an electrical subassembly claimed in claim 7, wherein:

said method also comprises the following steps performed with said assembly steps in a predetermined order:

placing solder between said contacting tips of said terminals and said other main conducting terminal and control terminal of said thyristor;

and applying heat to solder said contacting tips of said terminals to said other main conducting terminal and control terminal of said thyristor.

9. The method of making an electrical subassembly claimed in claim 7, wherein:

said applications of heat are performed jointly as a final step and is such that the adhesive effecting said sticking of said insulating sheet to said heat sink and said terminals to said insulating sheet is simultaneously set to securely retain these parts together.

10. An electrical subassembly for use in a control system comprising:

a heat sink in the form of an electrical conducting metal member having mounting and connecting means formed thereon and also a generally flat area;

a controllable thyristor soldered to said generally flat area of said heat sink with one of its main conducting terminals in contact with said heat sink;

a thin electrically insulating sheet stuck to said heat sink adjacent to said thyristor;

a pair of terminals having thyristor contacting tips formed thereon and capacitor portions spaced from said thyristor contacting tips and being stuck to said insulating sheet adjacent said thyristor so that said contacting tips thereof contact the other main conducting terminal and the control terminal, respectively, of said thyristor;

and a capacitor soldered across said capacitor bridging portions of said pair of terminals to form an electrical subassembly that may be connected by said heat sink connecting means and said pair of terminals to the control system where it is used.

11. The electrical subassembly for use in a control system claimed in claim 10, wherein:

said thyristor contacting tips of said terminals are soldered to said other main conducting terminal and said control terminal of said thyristor, respectively.

12. The electrical subassembly for use in a control system claimed in claim 10, wherein:

the adhesive effecting said sticking of said insulating sheet to said heat sink and said terminals to said insulating sheet has been set by heat to securely retain these parts together.

* * * * *